United States Patent
Ciulla

(10) Patent No.: US 8,714,828 B2
(45) Date of Patent: May 6, 2014

(54) WHEEL HUB ASSEMBLY WITH DUAL ROWS OF ROLLING ELEMENTS

(75) Inventor: Luca Ciulla, Turin (IT)

(73) Assignee: Aktiebolaget SKF, Gothenburg (SE)

(*) Notice: Subject to any disclaimer, the term of this patent is extended or adjusted under 35 U.S.C. 154(b) by 378 days.

(21) Appl. No.: 13/090,649

(22) Filed: Apr. 20, 2011

(65) Prior Publication Data

US 2011/0254353 A1   Oct. 20, 2011

(30) Foreign Application Priority Data

Apr. 20, 2010  (IT) ................. TO2010A000327

(51) Int. Cl.
| F16C 13/02 | (2006.01) |
| F16C 33/58 | (2006.01) |
| F16C 19/08 | (2006.01) |
| B60B 27/02 | (2006.01) |
| B60B 27/00 | (2006.01) |
| F16C 19/18 | (2006.01) |

(52) U.S. Cl.
CPC ......... *B60B 27/0005* (2013.01); *B60B 27/0026* (2013.01); *F16C 19/186* (2013.01); *B60B 2380/12* (2013.01)
USPC ......... 384/513; 384/516; 384/544; 301/105.1

(58) Field of Classification Search
USPC ......... 384/490, 512–513, 516, 544–543, 586, 384/589
See application file for complete search history.

(56) References Cited

U.S. PATENT DOCUMENTS

| 3,157,442 | A | * | 11/1964 | Gaubatz ................. 384/544 |
| 5,051,004 | A | * | 9/1991 | Takeuchi et al. ......... 384/512 |
| 5,501,530 | A | * | 3/1996 | Nagai et al. ............. 384/516 |
| 2005/0111771 | A1 | * | 5/2005 | Shevket .................. 384/544 |
| 2008/0205811 | A1 | * | 8/2008 | Komori et al. .......... 384/544 |
| 2009/0052823 | A1 |   | 2/2009 | Komori et al. |
| 2009/0154864 | A1 | * | 6/2009 | Komori et al. .......... 384/589 |
| 2009/0220183 | A1 | * | 9/2009 | Meeker et al. .......... 384/544 |
| 2009/0232435 | A1 |   | 9/2009 | Ohtsuki |
| 2009/0263066 | A1 | * | 10/2009 | Wakabayashi .......... 384/544 |

FOREIGN PATENT DOCUMENTS

| JP | 2008051164 | A | * | 3/2008 | ......... F16C 19/18 |
| JP | 2008051165 | A | * | 3/2008 | ......... F16C 19/38 |
| WO | WO2005008085 | A |   | 1/2005 | |

* cited by examiner

*Primary Examiner* — Marcus Charles
(74) *Attorney, Agent, or Firm* — Bryan Peckjian; SKF USA Inc. Patent Department

(57) ABSTRACT

A wheel hub assembly with two rows of rolling elements has a central axis of rotation and inner raceway and outer raceways for each row of elements, the associated inner and outer raceways being axially displaced in accordance with a respective angle of contact and along a respective load line such that the assembly is capable of accommodating combined loading. The raceways of each row of rolling elements have osculation ratios which are defined by the ratio between the radius of curvature of the raceways and the outside diameters of the rolling elements of the associated row of rolling elements. The osculation ratios of a first one of the two rows of the rolling elements are different than the osculation ratios of a second one of the two rows of the rolling elements.

12 Claims, 2 Drawing Sheets

WHEEL HUB ASSEMBLY WITH DUAL ROWS OF ROLLING ELEMENTS

CROSS REFERENCE

This application claims priority to Italian Patent Application No. TO2010A000327 filed on Apr. 20, 2010, the contents of which are incorporated fully herein by reference.

BACKGROUND OF THE INVENTION

The present invention relates to bearings, and more particularly to a wheel hub assembly with dual rows of rolling elements.

Wheel hub assemblies with two rows of rolling elements generally have an axis of rotation and include an inner ring, an outer ring arranged coaxially with and externally to the inner ring and, for each row of rolling elements, an inner raceway and an outer raceway formed, respectively, on the outside of the inner ring and on the inside of the outer ring which are axially displaced with respect to one another to allow the wheel hub assembly to accommodate combined loads, i.e. loads that act simultaneously in a radial direction and in an axial direction.

The wheel hub assemblies of the type described above are used in countless applications in the automobile field, and have undergone substantial structural modifications up to the incorporation in the inner and outer rings of flanges connecting to the wheels and chassis, thereby contributing to the creation of compact and light structures, as well as guaranteeing both simplified assembly, and increasingly greater reliability.

Due to increasingly restrictive anti-pollution regulations that have come into effect in recent years, it has been necessary to study technological solutions aimed, even indirectly, at reducing the energy consumption of automobiles and emissions noxious for the environment such as, for example, carbon monoxide emissions.

SUMMARY OF THE INVENTION

The object of the present invention is to provide a wheel hub assembly with two rows of rolling elements which, while maintaining high mechanical characteristics and reliability, permits a significant reduction of consumption and of pollutant emissions.

According to the present invention a wheel hub assembly with two rows of rolling elements provides an axis of rotation and comprises, for each row of rolling elements, an inner raceway and an outer raceway which are arranged in axially staggered positions in accordance with a respective angle of contact and along a respective load line in order to allow the assembly to support combined loads, the raceways of each row of rolling elements being provided with respective osculation ratios which are defined by the ratio between the radiuses of curvature of the raceways and the outer diameters of the rolling elements of the associated row of rolling elements; the wheel hub assembly is characterized in that the osculation ratios of a first row of rolling elements of the two rows of rolling elements are different from the osculation ratios of a second row of rolling elements of the two rows of rolling elements.

BRIEF DESCRIPTION OF THE SEVERAL VIEWS OF THE DRAWINGS

The invention will now be described with reference to the attached drawings which illustrate a few non-limiting embodiments, in which.

DETAILED DESCRIPTION OF THE INVENTION

Figure 1:
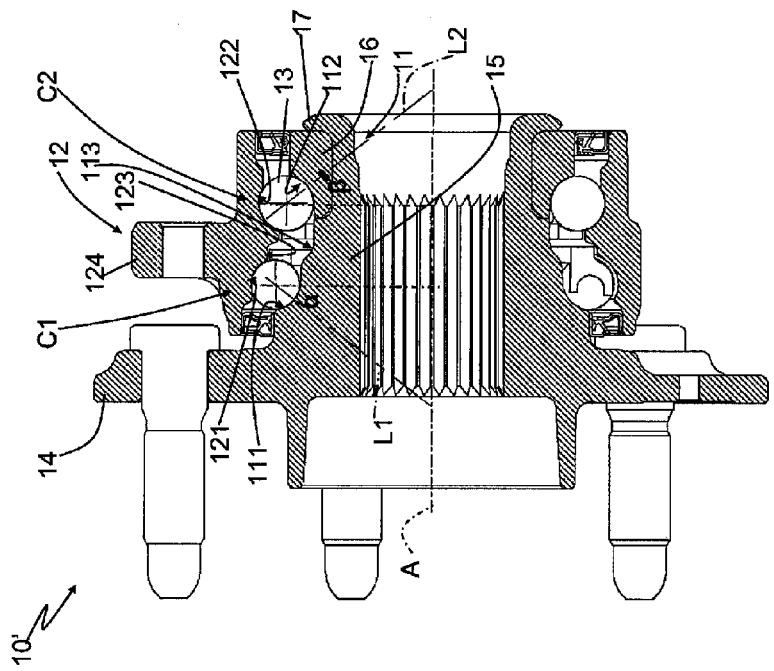
FIG. 1 illustrates, in cross section, a first preferred embodiment of a wheel hub assembly with two rows of rolling elements according to the present invention.

With reference to FIG. 1, a dual row wheel hub assembly 10 in accordance with the present invention has an axis A of rotation and preferably includes an inner ring 11 generally centered about the axis A, an outer ring 12 disposed coaxially about the inner ring 11, and two rows C1, C2 of rolling elements 13 disposed between the rings 11, 12. The two rings 11, 12 are angularly displaceable relative to each other due to the two rows C1, C2 of rolling elements 13. In the example described herein, the rolling elements 13 are balls, the centers of which are arranged along respective pitch diameters P1, P2, but could alternatively be any other appropriate type of bearing roller elements.

Figure 2:
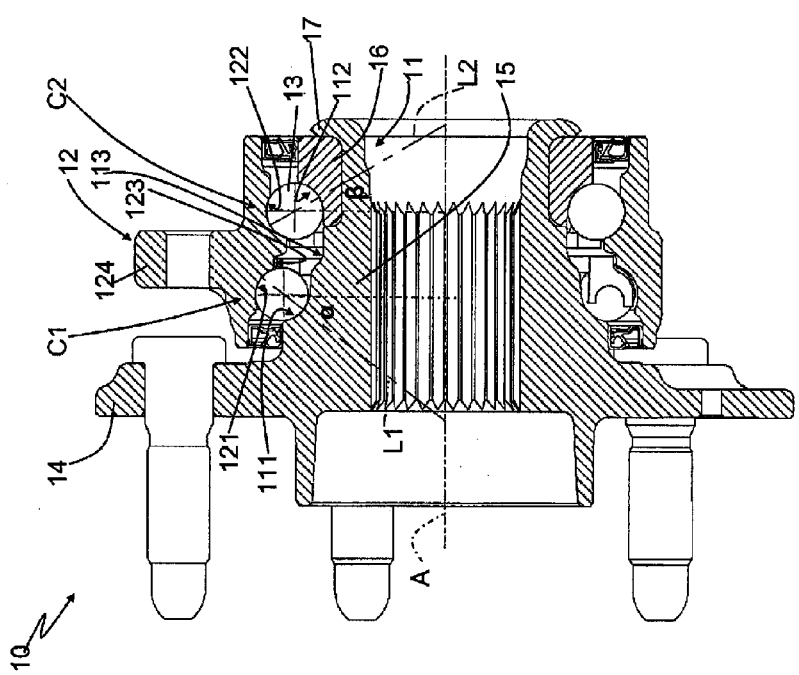
FIG. 2 illustrates, in cross section, a second preferred embodiment of a wheel hub assembly with two rows of rolling elements of FIG. 1. A second and different angle of contact β' between the second row of rolling elements C2 and the associated inner and outer raceways 112, 122 is shown.
Figure 3:
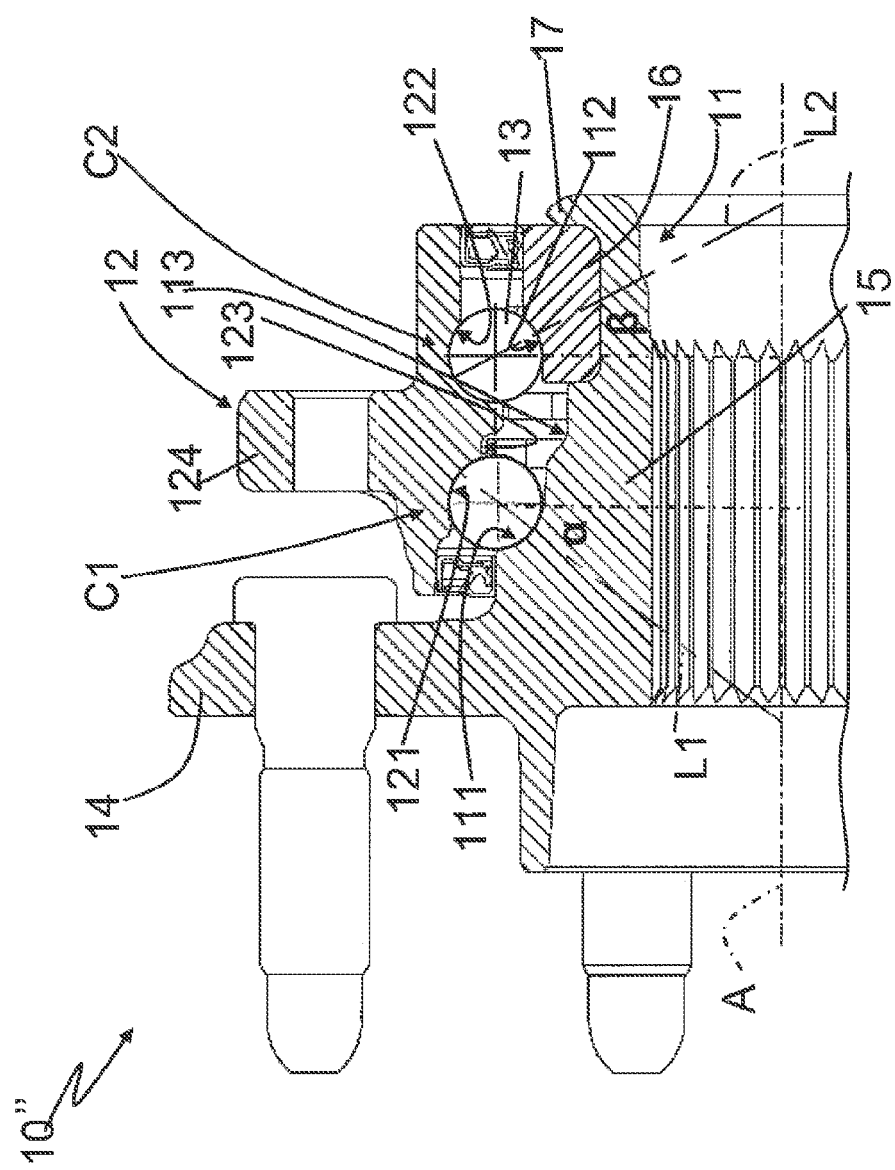
FIG. 3 illustrates, in cross section, a third preferred embodiment of the wheel hub assembly in which the first and second rows of rolling elements have an equal pitch diameter.

More specifically, the wheel hub assembly 10 basically comprises first and second inner raceways 111, 112 disposed about the central axis of rotation A, the first row C1 of rolling elements 13 being disposed on the first inner raceway 111 and the second row C2 of rolling elements 13 disposed on the second inner raceway 112, a first outer raceway 121 disposed generally about spaced from the first inner raceway 111 and a second outer raceway 122 disposed generally about the second inner raceway 112. The first outer raceway 112 is axially spaced from the first inner raceway such that a first load line L1 through the first row C1 of rolling elements 13 defines a first angle α of contact with respect to the central axis A. Further, the second outer raceway 122 is axially spaced from the second inner raceway 112 such that a second load line L2 through the second row C2 of rolling elements 13 defines a second angle β of contact with respect to the central axis A. The load lines L1, L2 join the points of contact between the balls 13 of each row C1, C2 with the associated inner rows 111, 112 and the associated outer raceways 121, 122, and form the respective angles α and β of contact with lines perpendicular to the axis A on a radial plane. Referring to FIG. 2, a second and different angle of contact β' between the second row of rolling elements C2 and the associated inner and outer raceways 112, 122 is shown. Referring again to FIG. 1, with the above structure, the assembly 10 is capable of accommodating combined loads, i.e., loading which acts simultaneously in the radial direction and in the axial direction, which are transmitted between balls 13 and inner raceways 111, 112 and between balls 13 and outer raceways 121, 122 along respective load lines L1, L2. Referring to FIG. 3, a third preferred embodiment of the wheel hub assembly in which the first and second rows of rolling elements have an equal pitch diameter is shown.

Further, each of the first and second inner raceways 111, 112 and each of the first and second outer raceways 121, 122 have a radius of curvature, each rolling element 13 of the first row C1 has a first outside diameter $\Phi 1$, and each rolling element 13 of the second row C2 has a second outside diameter $\Phi 2$. As such, the first row C1 of rolling elements 13 has an osculation ratio $O_{OE}$ defined between the radius of curvature of the first outer raceway 121 and the first outside diameter Φ1 and another osculation ratio $O_{OI}$ defined between radius of curvature of the first inner raceway 111 and the first outside diameter Φ1. Also, the second row C2 of rolling elements 13 has an osculation ratio $O_{IE}$ defined between radius of curvature of the second outer raceway 122 and the second rolling element outside diameter Φ2 and another osculation ratio $O_{II}$ defined between the radius of curvature of the second inner raceway 112 and the second outside diameter Φ2. Preferably, wheel hub assembly 10 is constructed such that the first angle α of contact has a value different than a value of the second angle β of contact, and each of the two osculation ratios $O_{OE}$, $O_{OI}$ of the first row C1 of rolling elements 13 has a value different than the value of the corresponding osculation ratios $O_{IE}$, $O_{II}$, respectively, of the second row C2 of rolling elements 13, as discussed in greater detail below.

The inner raceways 111, 112 are preferably formed outside or externally of the inner ring 11, while the outer raceways 121, 122 are preferably formed directly on an inner surface 123 of the outer ring 12 which, in the example of embodiment illustrated, is also provided with an outer flange 124 for anchoring the assembly 10 to a vehicle (not shown). The inner ring 11 is preferably a flanged ring configured for attaching the wheel hub assembly 10 to a wheel (not shown). Most preferably, the ring 11 includes a flange 14 extending generally transversely to the axis A of rotation, a spindle 15 extending generally along the axis A of rotation and made of the same material as the flange 14 (i.e., the flange and spindle are integrally formed), and an inner ring 16 mounted on the spindle 15, which is axially retained or "blocked" by a rolled edge 17.

The flange 14 and the ring 16 define, for the assembly 10, the so-called "outboard side" and, respectively, the "inboard side", and the inner raceway 111 of the row C1 is formed directly on an outer surface 113 of the spindle 15 in the vicinity of the flange 14, while the inner raceway 112 of the row C2 is formed directly on the ring 16. Alternatively, according to a form of embodiment that is not illustrated, the inner raceway 111 of row C1 can also be formed directly on a respective ring in an intermediate position between the flange 14 and the ring 16 and axially blocked by the flange 14 and ring 16 themselves.

In the exemplary embodiment illustrated, the dimensions of the pitch diameter P1 of the row C1 are greater than those of the pitch diameter P2 of row C2. However, everything described in this disclosure may also be advantageously applied to a wheel hub assembly in which the dimensions of the pitch diameter P1 of the row C1 are the same as the dimensions of the pitch diameter P2 of the row C2. For the sake of clarity, it is nevertheless worth underlining that an asymmetric wheel hub assembly with a pitch diameter P1 of the row C1, i.e. of the "outboard side" row, that is greater than the pitch diameter P2 of the row C2, i.e. of the row on the "inboard side", has, with all the other dimensions being the same, greater rigidity than a symmetric wheel hub assembly in which the dimensions of the pitch diameters of P1 and P2 are the same.

As discussed above, the raceways 111, 112, 121, 122 have respective osculation ratios $O_{xy}$ which are defined as the ratio between the radius of curvature r of the raceways 111, 112, 121, 122 and the associated one of the first and second outside diameters Φ1, Φ2 of the balls 13 of each row C1, C2. Specifically, the following osculation ratios are obtained:

$O_{OE}$: the ratio between the radius of curvature of the first outer raceway 121, outboard side, and the first outside diameter Φ1;

$O_{IE}$: the ratio between the radius of curvature of the second outer raceway 122, inboard side, and the second outside diameter Φ2;

$O_{OI}$: the ratio between the radius of curvature of the first inner raceway 111, outboard side, and the first outside diameter Φ1; and $O_{II}$: the ratio between the radius of curvature of the second inner raceway 112, inboard side, and the second outside diameter Φ2.

In the exemplary embodiment illustrated, in order to reduce slippage between the balls 13 and the associated raceways 111, 112, 121 and 122, i.e., reducing the friction between rolling elements and raceways and, thereby also reducing a possible source of dissipation of energy or for the purpose of reducing consumption and pollutant emissions, in the wheel hub assembly 10, the osculation ratios $O_{OE}$ and $O_{OI}$ of the first row C1 of rolling elements 13 are different from the respective osculation ratios $O_{IE}$ and $O_{II}$ of the second row C2 of rolling elements 13, as mentioned above. The best performance in terms of friction reduction is obtained when the wheel hub assembly 10 is made according to any one of the following geometrical conditions:

$$O_{OE} > O_{IE}; \text{ or} \qquad 1)$$

$$O_{OI} > O_{II}; \text{ or} \qquad 2)$$

$$O_{OE} > O_{IE} \text{ and } O_{OI} > O_{II}. \qquad 3)$$

In particular, it was found that the optimum conditions in terms of friction reduction are obtained when the wheel hub assembly 10 is made according to any one of the following geometrical conditions:

$$O_{OE} > 1.004 O_{IE}; \text{ or} \qquad 1)$$

$$O_{OI} > 1.004 O_{II}; \text{ or} \qquad 2)$$

$$O_{OE} > 1.004 O_{IE} \text{ and } O_{OI} > 1.004 O_{II}. \qquad 3)$$

The different osculation ratios of the outboard side compared with the inboard side can be attained either by varying the radius of curvature of the associated raceways 111, 121 of the outboard side compared with the radius of curvature of raceways 112, 122 of the inboard side, or by varying the outside diameters Φ1, Φ2 of the balls 13. In other words, the different osculation ratios of the outboard side compared with the inboard side can be obtained by making a wheel hub assembly 10', as alternatively illustrated in FIG. 3, in which the first outside diameters Φ1 of the balls 13 of the first row C1 do not have the same dimensions as the dimensions of the second outside diameters Φ2 of the balls 13 of the second row C2 of rolling elements 13, as in the exemplary embodiment described above, but in which the first outside diameters Φ1 of the balls 13 of the first row C1 have a value lesser than the value of the second outside diameters Φ2 of the balls 13 of the second row C2.

The reduction of the outside diameters Φ1 of the balls 13 entails, with the same dynamic and structural conditions described above, a reduction of the tangential velocity between balls 13 and raceways and, therefore, a reduction of friction.

In the exemplary embodiments depicted and described, the variation of the osculation ratios of the inboard side compared with the outboard side leads to a reduction of slippage between the balls 13 and the associated raceways 111, 112, 121, 122 and, therefore also leads to a reduction of the friction between rolling elements and raceways. The reduction of friction obtained by differentiating the osculation ratios reduces a possible source of dissipation of energy and, as a consequence, reduces the consumption and pollutant emissions of vehicles on which the wheel hub assembly 10 or 10' is used.

Therefore, since what has been described above can also be advantageously applied to a symmetric wheel hub assembly in which the dimensions of the pitch diameter P1 of the row C1 are the same as the dimensions of the pitch diameter P2 of the row C2, it should also be understood that the above can be applied advantageously to an asymmetric wheel hub assembly in which the value of the pitch diameter P1 of the first row C1 are smaller than the value of the pitch diameter P2 of the second row C2.

It is intended that the invention not be limited to the embodiments described and illustrated here, which are to be considered as examples of a wheel hub assembly with two rows of rolling bodies; rather, the invention is open to further modifications as regards shapes and arrangements of parts, and constructional and assembly details. Thus, this invention is intended to cover modifications within the spirit and scope of the present invention as generally defined in the appended claims.

I claim:

1. A wheel hub assembly comprising:
   first and second inner raceways disposed about a central axis of rotation, each one of the first and second inner raceways having a radius of curvature;
   a first row of rolling elements disposed on the first inner raceway and a second row of rolling elements disposed on the second inner raceway, each rolling element of the first row having a first outside diameter and each rolling element of the second row of rolling elements having a second outside diameter that is equal to the first outside diameter; and
   first and second outer raceways each having a radius of curvature, the first outer raceway being disposed generally about and axially spaced from the first inner raceway such that a first load line through the first row of rolling elements defines a first angle of contact with respect to the central axis, and the second outer raceway being disposed generally about and axially spaced from the second inner raceway such that a second load line through the second row of rolling elements defines a second angle of contact with respect to the central axis; and
   wherein the first row of rolling elements has an osculation ratio defined between the first outer raceway radius of curvature and the first rolling element outside diameter and another osculation ratio defined between the first inner raceway radius of curvature and the first outside diameter, the second row of rolling elements has an osculation ratio defined between the second outer raceway radius of curvature and the second rolling element outside diameter and another osculation ratio defined between the second inner raceway radius of curvature and the second outside diameter, and each of the two osculation ratios of the first row of rolling elements has a value different than the value of the corresponding osculation ratio of the second row of rolling elements.

2. The wheel hub assembly according to claim 1, wherein the osculation ratio between the radius of curvature of the first outer raceway and the first rolling element outside diameter has a value which is greater than the value of the osculation ratio between the radius of curvature of the second outer raceway and the second rolling element outside diameter.

3. The wheel hub assembly according to claim 2, wherein the osculation ratio between the radius of curvature of the first outer raceway and the first rolling element outside diameter is at least 1.004 times greater than the osculation ratio between the radius of curvature of the second outer raceway and the second rolling element outside diameter.

4. The wheel hub assembly according to claim 1, wherein the osculation ratio between the radius of curvature of the first inner raceway and the first rolling element outside diameter has a value which is greater than a value of the osculation ratio between the radius of curvature of the second inner raceway and the second rolling element outside diameter.

5. The wheel hub assembly according to claim 4, wherein the osculation ratio between the radius of curvature of the first inner raceway and the first rolling element outside diameter is at least 1.004 times greater than the osculation ratio between the radius of curvature of the second inner raceway and the second rolling element outside diameter.

6. The wheel hub assembly according to claim 5, wherein the pitch diameter of the first row of rolling elements is equal to the pitch diameter of the second row of rolling elements.

7. The wheel hub assembly according to claim 5, wherein: the wheel hub assembly further comprises an inner ring generally centered about the axis and an outer ring disposed coaxially about the inner ring, the first and second inner raceways being disposed externally of the inner ring and the first and second outer raceways being disposed internally of the outer ring.

8. The wheel hub assembly according to claim 7, wherein the inner ring has a flange extending generally transversely to the central axis and configured for connecting the wheel hub assembly to a wheel.

9. The wheel hub assembly according to claim 8, wherein the first inner raceway is formed generally proximal to the flange.

10. The wheel hub assembly according to claim 9, wherein the inner ring further includes a generally axially-extending spindle formed integrally with the flange, the first inner raceway being provided by an outer surface of the spindle.

11. The wheel hub assembly according to claim 10, wherein the inner ring further includes a ring mounted on the spindle and providing the second inner raceway.

12. The wheel hub assembly according to claim 11, wherein the first and second outer raceways are provided by inner surfaces of the outer ring.

* * * * *